United States Patent
Inomata et al.

(10) Patent No.: US 12,373,619 B2
(45) Date of Patent: Jul. 29, 2025

(54) SHOE DESIGNING SUPPORT DEVICE THAT ESTIMATES IMPRESSION INDEX, AND SHOE DESIGNING SUPPORT METHOD THAT ESTIMATES IMPRESSION INDEX

(71) Applicant: ASICS CORPORATION, Kobe (JP)

(72) Inventors: Takashi Inomata, Kobe (JP); Satoru Abe, Kobe (JP); Mizuho Irie, Kobe (JP); Masaru Ichikawa, Kobe (JP); Shiori Terasaki, Tokyo (JP)

(73) Assignee: ASICS CORPORATION, Kobe (JP)

( * ) Notice: Subject to any disclaimer, the term of this patent is extended or adjusted under 35 U.S.C. 154(b) by 1155 days.

(21) Appl. No.: 17/255,969

(22) PCT Filed: Jul. 17, 2019

(86) PCT No.: PCT/JP2019/028148
§ 371 (c)(1),
(2) Date: Dec. 23, 2020

(87) PCT Pub. No.: WO2021/009880
PCT Pub. Date: Jan. 21, 2021

(65) Prior Publication Data
US 2021/0173984 A1    Jun. 10, 2021

(51) Int. Cl.
*G06F 30/27* (2020.01)
*G06N 20/00* (2019.01)
(Continued)

(52) U.S. Cl.
CPC ............. *G06F 30/27* (2020.01); *G06N 20/00* (2019.01); *G06F 2111/20* (2020.01); *G06F 2113/12* (2020.01)

(58) Field of Classification Search
CPC .. G06F 30/27; G06F 2113/12; G06F 2111/20; G06N 20/00
See application file for complete search history.

(56) References Cited

U.S. PATENT DOCUMENTS 11,858,651 B2 *   1/2024   Chopra ................... G06F 18/40
2003/0088458 A1   5/2003   Afeyan et al.
(Continued)

FOREIGN PATENT DOCUMENTS

JP    H10-124476 A    5/1998
JP    H10-301981 A    11/1998
(Continued)

OTHER PUBLICATIONS

Y. W. Chen, D. Chen, X. Han, "Generic and Specific Impression Estimation of Clothing Fabric Images Based on Machine Learning" pp. 1-5, (Year: 2015).*

(Continued)

*Primary Examiner* — Kibrom K Gebresilassie
(74) *Attorney, Agent, or Firm* — Studebaker Brackett PLLC

(57) ABSTRACT

A design element index input unit 10 inputs multiple design element indexes obtained by quantifying design in association with multiple portions constituting shoes. A learning unit 40 uses, as teacher data, pairs of multiple design element indexes and an impression index to learn correlations between multiple design element indexes and the impression index, and creates an impression estimation model. By means of a learned impression estimation model, an impression index estimation unit 60 estimates an impression index obtained by quantifying an impression of shoes, based on a set of multiple design element indexes that have been input. An output unit 70 outputs the estimated impression index.

9 Claims, 19 Drawing Sheets

(51) Int. Cl.
    *G06F 111/20*     (2020.01)
    *G06F 113/12*     (2020.01)

(56) References Cited

U.S. PATENT DOCUMENTS

| 2015/0058160 | A1* | 2/2015 | Cao ................ G06T 7/66 |
| | | | 705/26.7 |
| 2015/0100455 | A1* | 4/2015 | Kitou .............. G06Q 30/0631 |
| | | | 705/26.7 |
| 2018/0374136 | A1 | 12/2018 | Kanii et al. |
| 2020/0134369 | A1* | 4/2020 | Chopra ............ B64D 45/00 |

FOREIGN PATENT DOCUMENTS

| JP | 2000-235588 A | 8/2000 |
| JP | 2000-285151 A | 10/2000 |
| JP | 2004-529406 A | 9/2004 |
| JP | 2012-155422 A | 8/2012 |
| JP | 2012-178130 A | 9/2012 |
| WO | 2011/103272 A2 | 8/2011 |
| WO | 2017/098760 A1 | 6/2017 |

OTHER PUBLICATIONS

M. Pavlou, N. M. Allinson, "Automated encoding footwear patterns for fast indexing", pp. 402-409 (Year: 2009).*
International Search Report issued in PCT/JP2019/028148; mailed Oct. 15, 2019.
Naoyuki Nozaki et al. "Application of Artificial Intelligence Technology in Product Design" Fujitsu, May 1, 2016, pp. 58-65, vol. 67, No. 3.
The extended European search report issued by the European Patent Office on Feb. 17, 2022, which corresponds to European Patent Application No. 19933213.1-1222 and is related to U.S. Appl. No. 17/255,969.

* cited by examiner

FIG. 10

TARGET SEGMENT: SERIOUS RUNNERS

| DESIGN ELEMENT INDEX D1 SHOE HEIGHT [% WITH RESPECT TO FOOT LENGTH] | DESIGN ELEMENT INDEX D2 TIPTOE ELEVATION ANGLE [DEGREES] | DESIGN ELEMENT INDEX D3 OVERALL AVERAGE BRIGHTNESS | DESIGN ELEMENT INDEX D4 OVERALL AVERAGE CHROMA | ... | DESIGN ELEMENT INDEX Dm | IMPRESSION INDEX I1 | IMPRESSION INDEX I2 | ... | IMPRESSION INDEX In |
|---|---|---|---|---|---|---|---|---|---|
| 42.6 | 11.9 | 0.51 | 0.83 | ... | ... | B | B | ... | ... |
| 43.4 | 13.4 | 0.27 | 0.79 | ... | ... | A | A | ... | ... |
| 45.4 | 18.1 | 0.43 | 0.73 | ... | ... | A | C | ... | ... |
| 46.1 | 22.7 | 0.25 | 0.74 | ... | ... | B | C | ... | ... |

FIG. 11

TARGET SEGMENT: FUN RUNNERS

| DESIGN ELEMENT INDEX D1 SHOE HEIGHT [% WITH RESPECT TO FOOT LENGTH] | DESIGN ELEMENT INDEX D2 TIPTOE ELEVATION ANGLE [DEGREES] | DESIGN ELEMENT INDEX D3 OVERALL AVERAGE BRIGHTNESS | DESIGN ELEMENT INDEX D4 OVERALL AVERAGE CHROMA | ... | DESIGN ELEMENT INDEX Dm | IMPRESSION INDEX I1 | IMPRESSION INDEX I2 | ... | IMPRESSION INDEX In |
|---|---|---|---|---|---|---|---|---|---|
| 42.6 | 11.9 | 0.51 | 0.83 | ... | ... | B | C | ... | ... |
| 43.4 | 13.4 | 0.27 | 0.79 | ... | ... | A | B | ... | ... |
| 45.4 | 18.1 | 0.43 | 0.73 | ... | ... | B | B | ... | ... |
| 46.1 | 22.7 | 0.25 | 0.74 | ... | ... | C | C | ... | ... |

SHOE DESIGNING SUPPORT DEVICE THAT ESTIMATES IMPRESSION INDEX, AND SHOE DESIGNING SUPPORT METHOD THAT ESTIMATES IMPRESSION INDEX

TECHNICAL FIELD

The present invention relates to a technology for supporting product designing and also to a technology for product recommendation.

BACKGROUND ART

Design of products, such as shoes and clothes, is often determined based on experiences and knowledge of designers. Accordingly, whether the design of a product suits the preference of a user largely depends on the skill and senses of the designer.

For example, Patent Literature 1 discloses a design construction support system that accepts redesigns from a user and provides a more suitable substitute candidate based on difference calculation using evaluations stored in the system.

Patent Literature 2 discloses an information processing device that creates article design based on content selected by a user and presents the created article design to the user.

Patent Literature 3 discloses a method for determining relative affinity for a product form of at least one consumer in a group of consumers.

PRIOR ART REFERENCE

Patent Literature

Patent Literature 1: Japanese Unexamined Patent Application Publication No. 2000-235588
Patent Literature 2: WO 2017/098760
Patent Literature 3: Japanese Translation of PCT International Application Publication No. 2004-529406

SUMMARY OF INVENTION

Technical Problem

When a product is designed by combining design elements related to portions of the product, a user's impressions of the product as a whole are difficult to accurately estimate. Also, how to modify an individual design element to improve the user's impressions of the product is difficult to present to the designer. Further, recommending a product based on the user's impressions and evaluations for products is also needed.

The present invention has been made in view of such a problem, and a purpose thereof is to provide a technology for evaluating impressions of a product based on a set of design elements related to portions of the product, and supporting improvement of the impressions. Another purpose is to provide a technology for recommending a product based on impressions and evaluations for products.

Solution to Problem

To solve the problem above, a designing support device of one aspect of the present invention includes: an input unit that inputs multiple design element indexes obtained by quantifying design in association with multiple portions constituting shoes; an estimation unit that estimates an impression index obtained by quantifying an impression of the shoes, based on a set of multiple design element indexes that have been input; and an output unit that outputs the impression index thus estimated.

Another aspect of the present invention relates to a designing support method. The method includes: inputting multiple design element indexes obtained by quantifying design in association with multiple portions constituting shoes; estimating an impression index obtained by quantifying an impression of the shoes, based on a set of multiple design element indexes that have been input; and outputting the impression index thus estimated.

Yet another aspect of the present invention relates to a designing support device. The device includes: an input unit that inputs multiple design element indexes obtained by quantifying at least design in association with multiple portions constituting clothes; an estimation unit that estimates multiple impression indexes obtained by quantifying impressions of the clothes, based on a set of multiple design element indexes that have been input; and an output unit that outputs the multiple impression indexes thus estimated.

Still yet another aspect of the present invention relates to a recommendation device. The device includes: a learning unit that uses, as teacher data, pairs of multiple design element indexes obtained by quantifying design in association with multiple portions constituting shoes and an impression index obtained by quantifying an impression of the shoes, to learn correlations between multiple design element indexes and the impression index, and that creates an impression estimation model; an estimation unit that estimates, by means of the impression estimation model thus learned, the impression index based on multiple design element indexes of shoes specified by a user; and a recommendation unit that recommends other shoes having an impression index similar to the impression index that has been estimated.

A further aspect of the present invention also relates to a recommendation device. The device includes: a learning unit that uses, as teacher data, pairs of multiple design element indexes obtained by quantifying design in association with multiple portions constituting clothes and an impression index obtained by quantifying an impression of the clothes, to learn correlations between multiple design element indexes and the impression index, and that creates an impression estimation model; an estimation unit that estimates, by means of the impression estimation model thus learned, the impression index based on multiple design element indexes of clothes specified by a user; and a recommendation unit that recommends other clothes having an impression index similar to the impression index that has been estimated.

Optional combinations of the aforementioned constituting elements, and implementation of the present invention in the form of methods, apparatuses, systems, computer programs, data structures, and recording media may also be practiced as additional modes of the present invention.

Advantageous Effects of Invention

With the present invention, impressions of a product can be evaluated based on a set of design elements related to portions of the product, and improvement of the impressions can be supported. Also, a product can be recommended based on impressions and evaluations for products.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 10 illustrates correlations between design element indexes and impression indexes of shoes, with regard to a target segment;

FIG. 11 illustrates correlations between the design element indexes and the impression indexes of the shoes, with regard to another target segment;

DESCRIPTION OF EMBODIMENTS

First Embodiment

Figure 1:
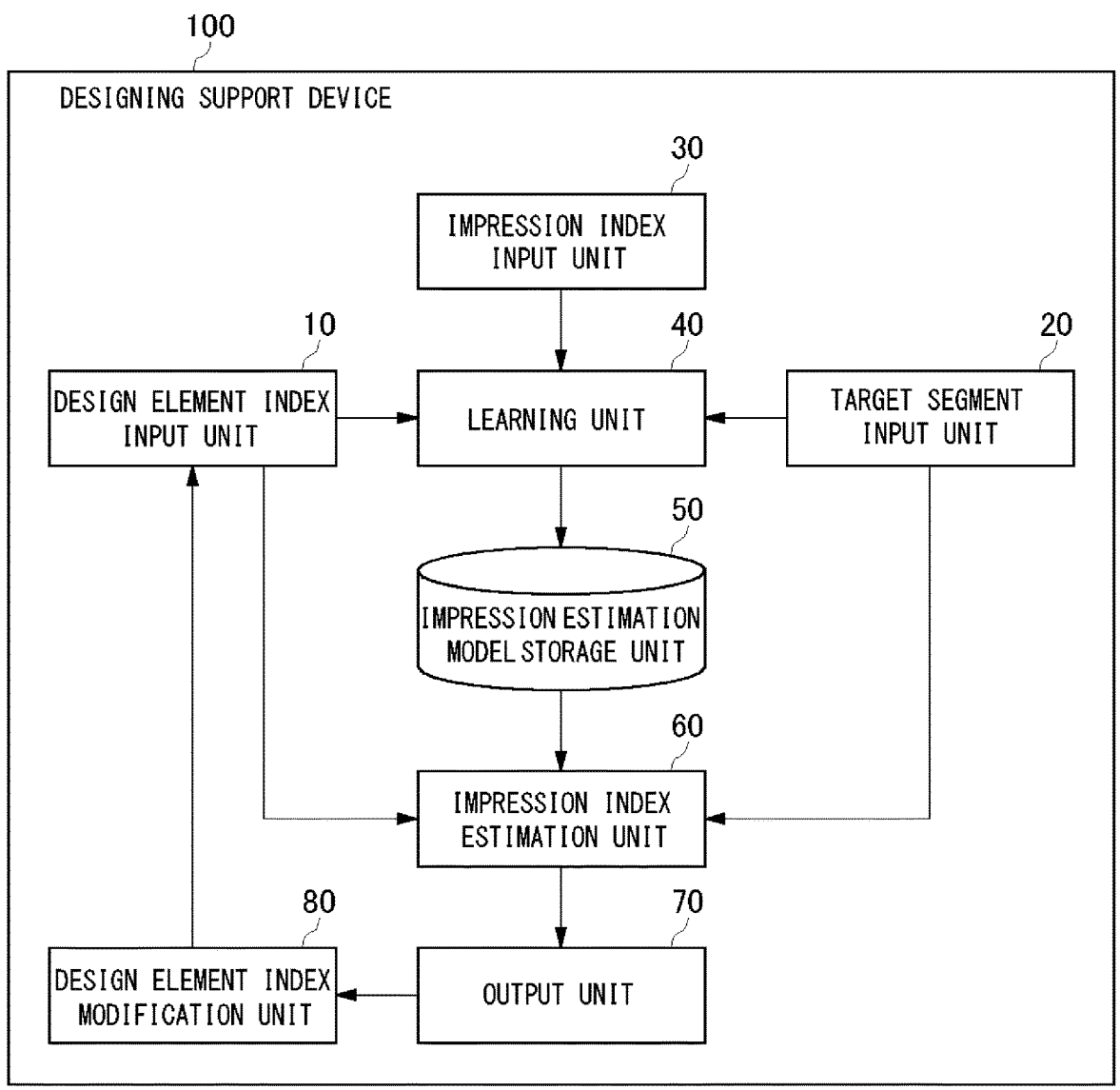
FIG. 1 is a configuration diagram of a designing support device of a first embodiment.

FIG. 1 is a configuration diagram of a designing support device 100 of the present embodiment. FIG. 1 is a block diagram featuring the functions, and these functional blocks may be implemented in a variety of forms by hardware only, software only, or a combination thereof.

In the present embodiment, shoes are selected as an example of products. The designing support device 100 evaluates impression indexes of entire shoes for a target user segment, based on design element indexes of parts of the shoes.

A design element index input unit 10 inputs a design element index obtained by quantifying design in association with entire shoes or a portion (part) constituting the shoes. A design element index is an index related to a shape, color, or texture, in association with the entire shoes or a portion constituting the shoes.

Figure 2:
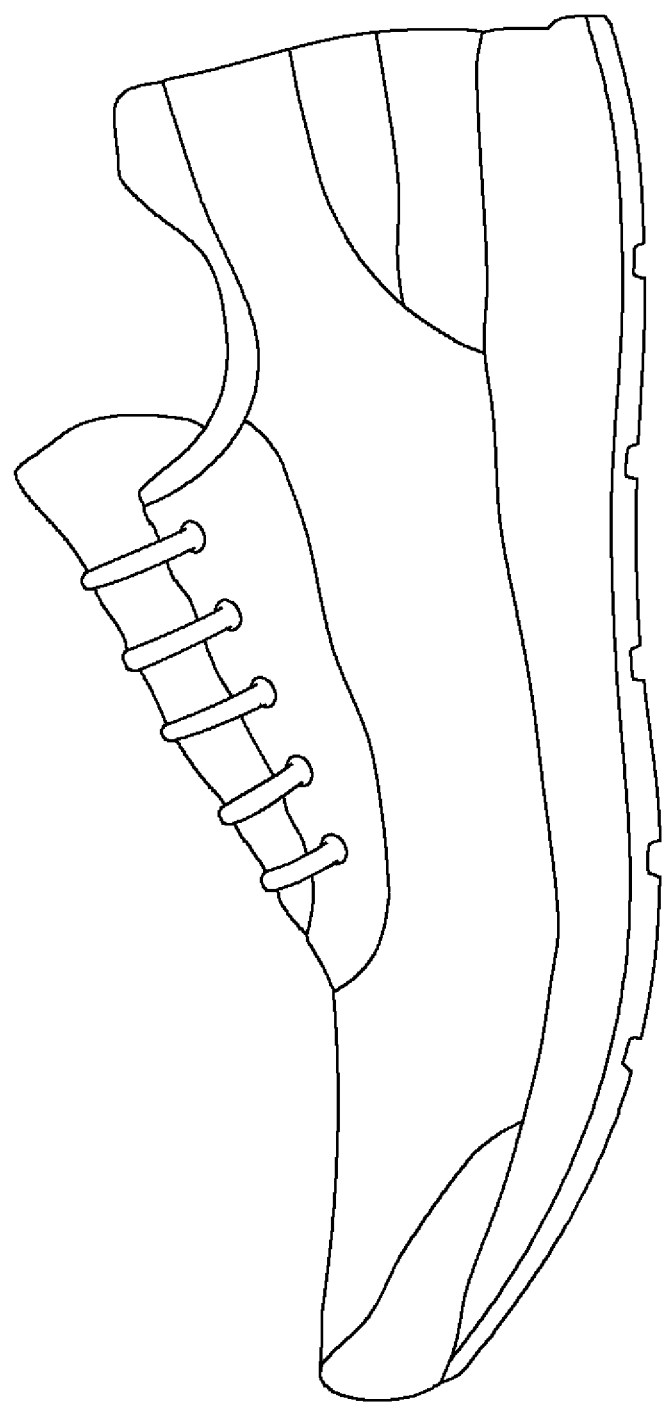
FIG. 2 illustrates an example of design of an entire shoe.

FIG. 2 illustrates an example of design of an entire shoe. A shoe is divided into two portions of a sole and an upper.

Figure 3:
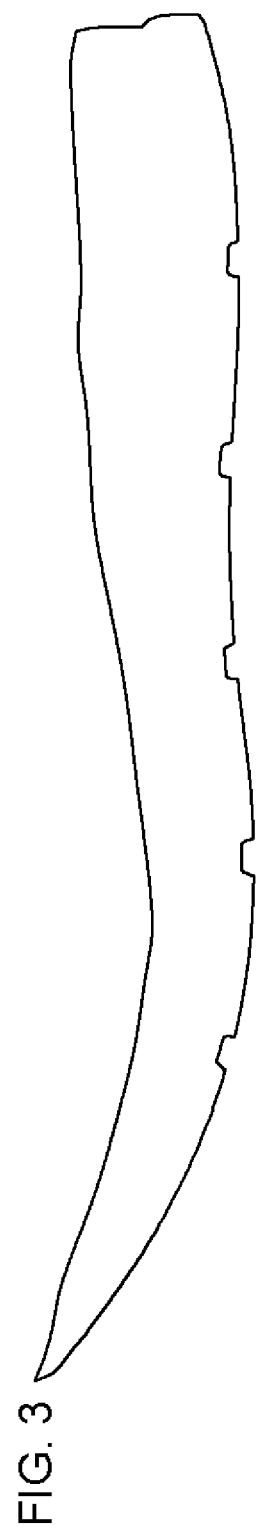
FIG. 3 illustrates the sole of the shoe of FIG. 2.
Figure 4:
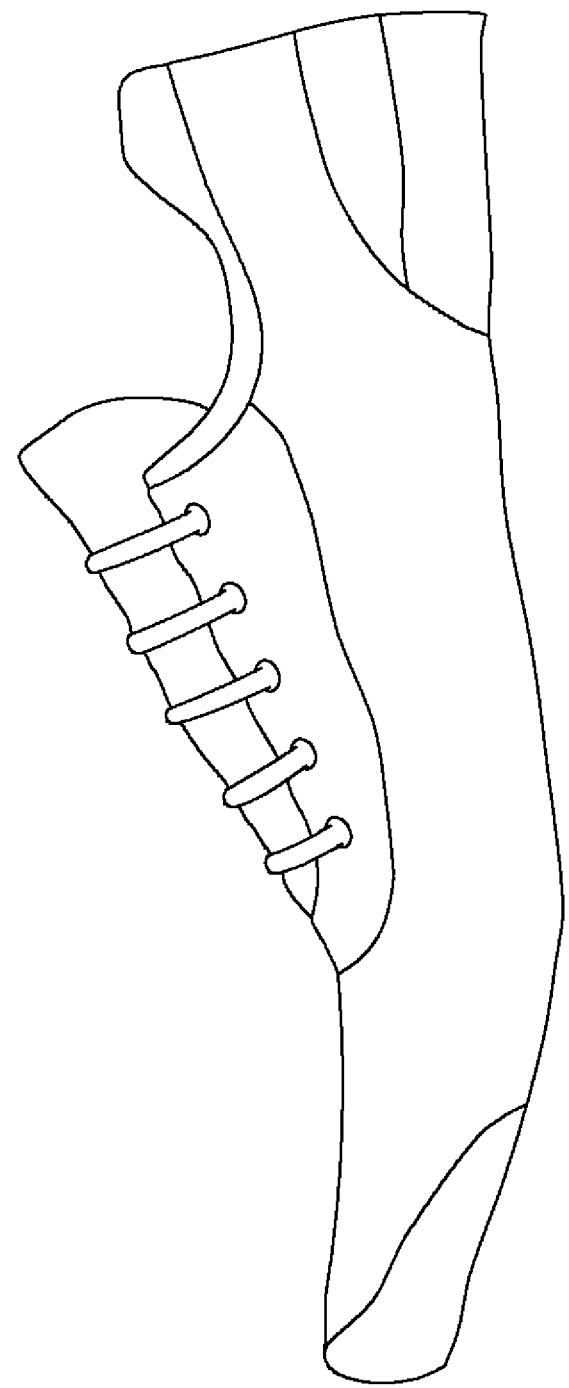
FIG. 4 illustrates the upper of the shoe of FIG. 2.
Figure 5:
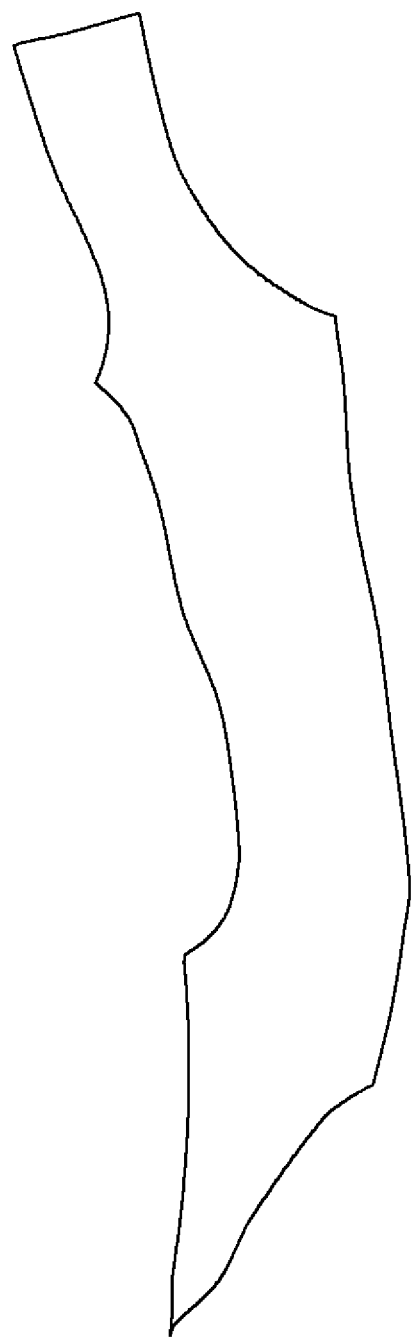
FIG. 5 illustrates the texture provided in the upper of the shoe.

FIG. 3 illustrates the sole of the shoe of FIG. 2, and FIG. 4 illustrates the upper of the shoe of FIG. 2. In the design example of FIG. 2, a plain texture is provided in the shoe upper of FIG. 3. Alternatively, a striped texture or a dotted texture may be provided. FIG. 5 illustrates the plain texture provided in the shoe upper.

Figure 6:
FIG. 6 illustrates a radius of curvature of the instep of a shoe.
Figure 7:
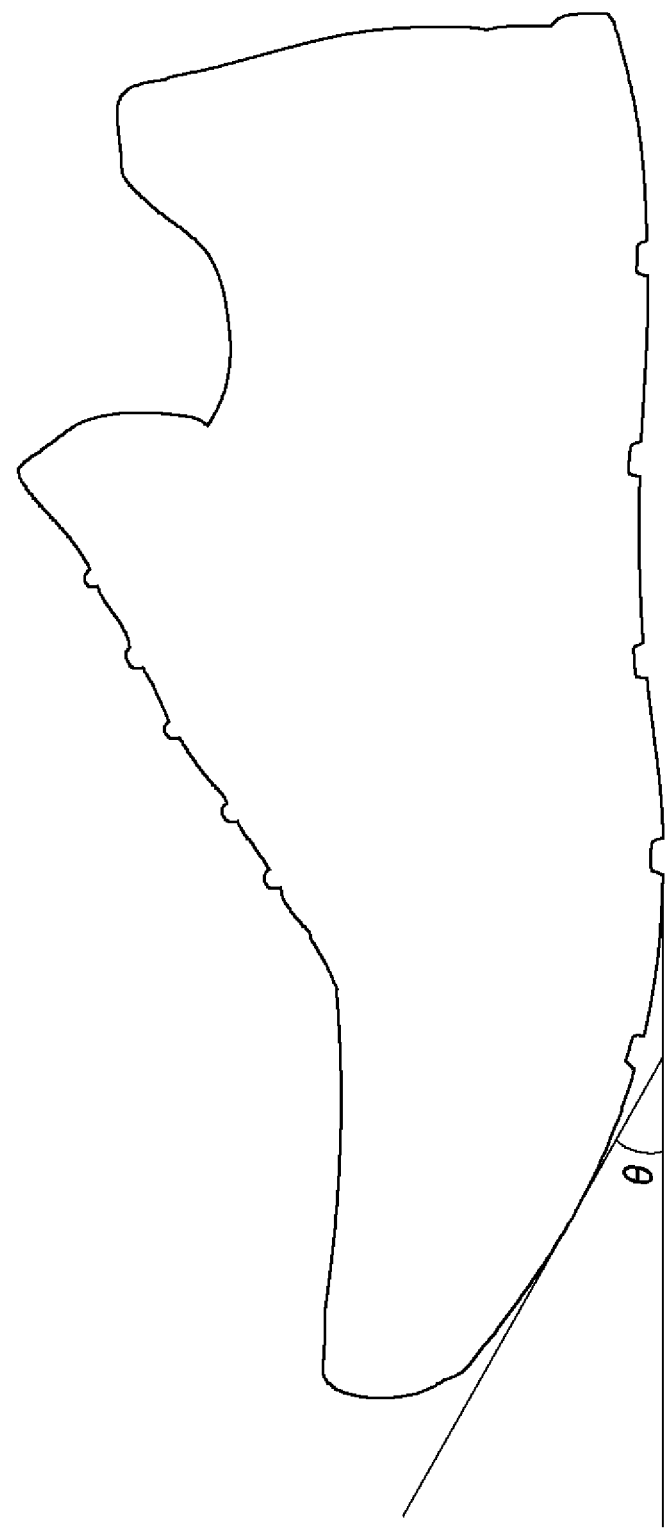
FIG. 7 illustrates a tiptoe elevation angle of a shoe.
Figure 8:
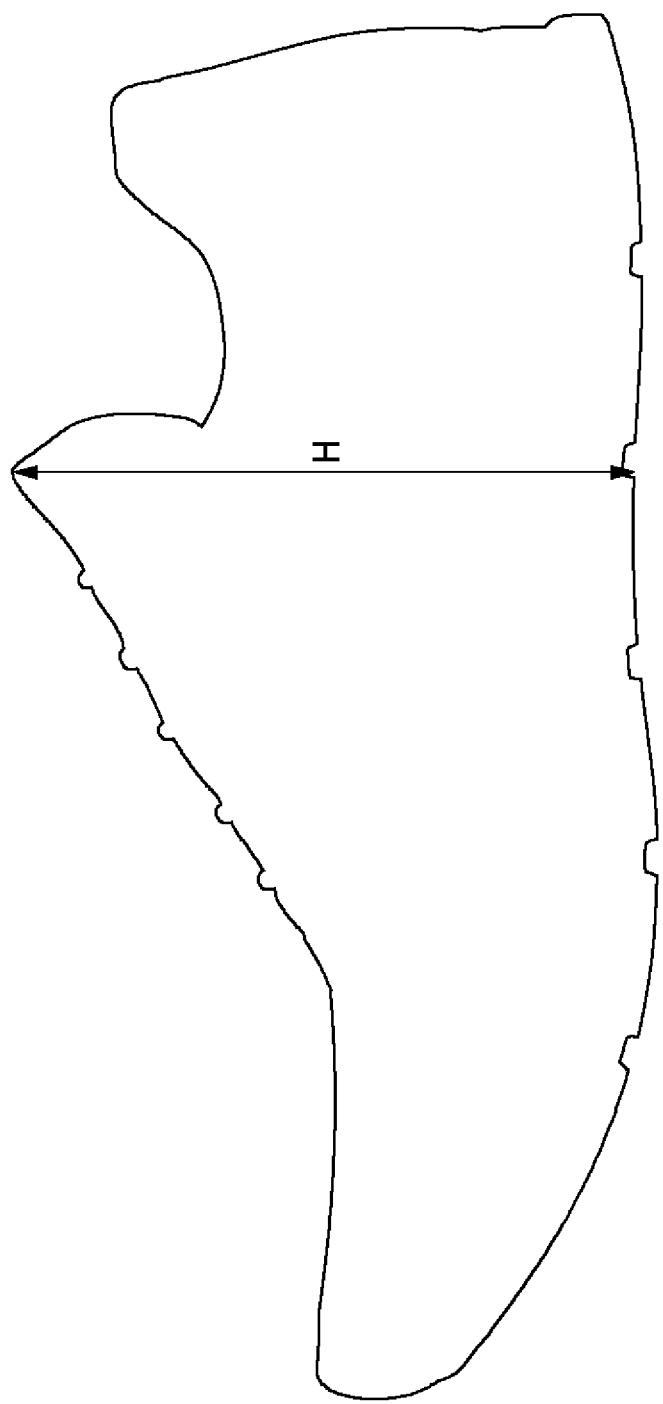
FIG. 8 illustrates a height of a shoe.

Examples of design element indexes related to shapes will be described. FIG. 6 illustrates a radius of curvature R of the instep of a shoe, FIG. 7 illustrates a tiptoe elevation angle $\theta$ of a shoe, and FIG. 8 illustrates a height H of a shoe. The radius of curvature R of a shoe instep, the tiptoe elevation angle $\theta$ of a shoe, and the height H of a shoe are examples of indexes related to the shape of an entire shoe. Indexes related to the shapes of portions of a shoe include the shape of the sole as shown in FIG. 3 and the shape of the upper as shown in FIG. 4. The shape of the sole includes the thickness of the entire sole, and a variation in the sole thickness from the tiptoe to the heel, for example. The shape of the upper includes the narrowness of the tiptoe side, and a variation in the curvature of the curve in the heel part, for example.

Examples of design element indexes related to colors will be described. Indexes related to the colors of the entire shoe as shown in FIG. 2 include indexes of overall average hue, overall average brightness, and overall average chroma, which are respectively represented by average values of the hue, brightness, and chroma of the entire shoe. The indexes related to the colors of the entire shoe also include indexes of the center of hue, the center of brightness, and the center of chroma in a longitudinal direction or a vertical direction, which are respectively represented by the positions of the center of hue, the center of brightness, and the center of chroma in a longitudinal direction or a vertical direction of the shoe. The longitudinal direction of a shoe means the direction from the tiptoe to the heel of the shoe, and the vertical direction of a shoe means the direction from the upper to the sole of the shoe. Similar indexes related to colors may also be defined for portions of a shoe, such as the upper of FIG. 3 and the sole of FIG. 4.

Examples of design element indexes related to a texture will be described. As shown in FIG. 3, a plain texture may be provided in a shoe upper. Other examples of the texture include a striped texture and a dotted texture. The indexes related to a texture include indexes related to the shape and the position of the texture in a portion of a shoe.

Referring back to FIG. 1, a target segment input unit 20 inputs a target user segment. The users may be classified into segments based on attributes, such as the gender, age, residence, running frequency, and running experiences. For example, the users may be classified into multiple target segments, such as "serious runners" who are seriously committed to running, and "fun runners" who enjoy running as a hobby.

An impression index input unit 30 inputs impression indexes obtained by quantifying users' impressions of shoes and sorting the impressions by target segment. The impression indexes include sturdiness, a sense of speed, and a sense of luxury, for example. The users belonging to each target segment evaluate each impression index using evaluation values, such as three levels of A (excellent), B (average), and C (inferior), and the obtained evaluation data are used. For shoes having the same design, the evaluation value of each impression index varies depending on the user segment.

Figure 9:
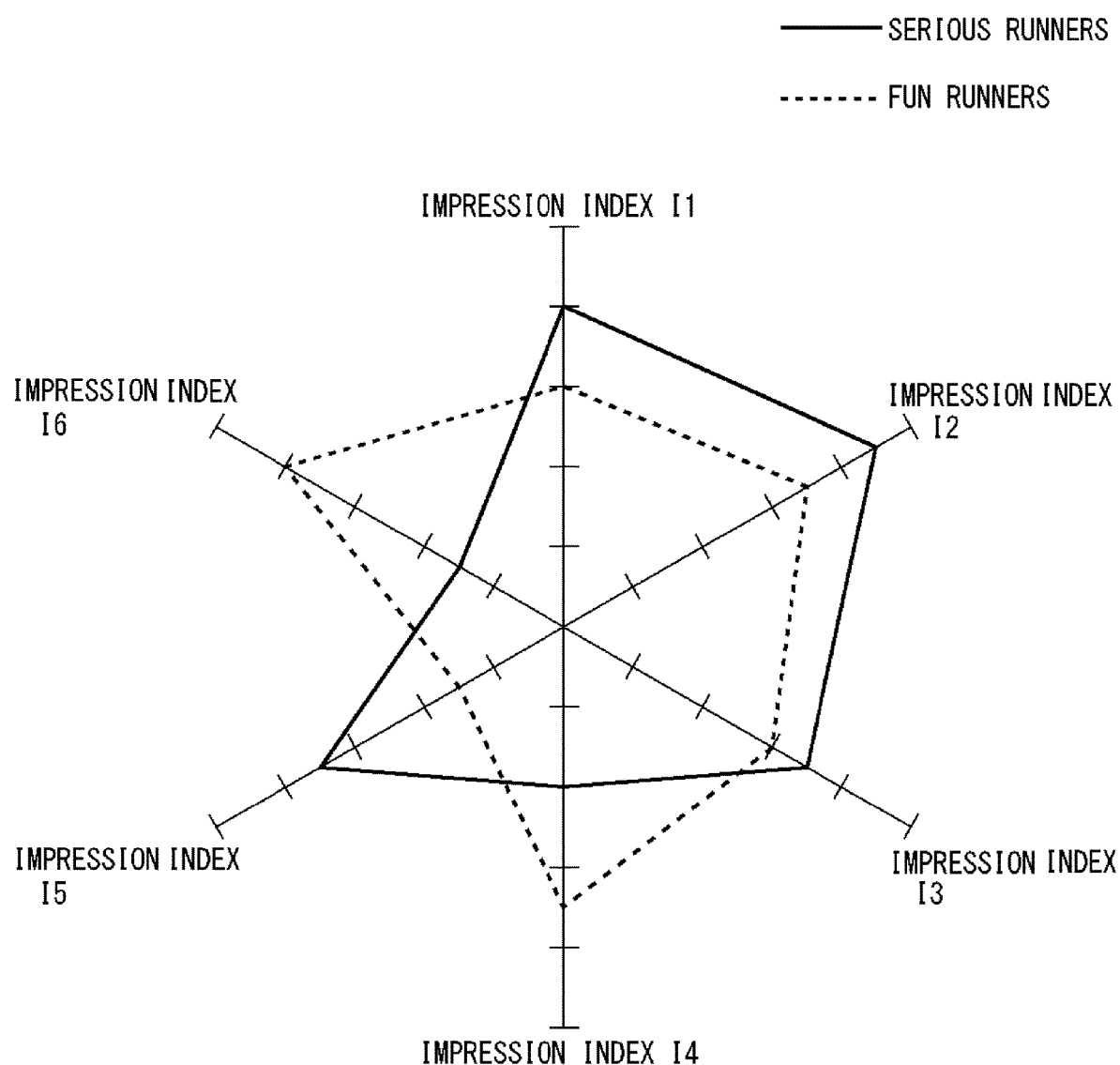
FIG. 9 illustrates examples of impression indexes for each target segment.

FIG. 9 illustrates examples of impression indexes for each target segment. This example illustrates six impression indexes I1 to I6 for the subject shoes. For the same shoe design, the evaluation values of the impression indexes I1 to I6 for the serious runners are different from those for the fun runners.

Referring back to FIG. 1, a learning unit 40 uses as teacher data: the design element indexes of the subject shoes in the learning, provided by the design element index input unit 10; the target segment provided by the target segment input unit 20; and the impression indexes of the subject shoes for users belonging to the target segment, provided by the impression index input unit 30. The learning unit 40 uses the teacher data to learn correlations between the design element indexes and the impression indexes, and creates an impression estimation model for each target segment. When the users are not classified into segments, the learning unit 40 uses, as teacher data, pairs of design element indexes and impression indexes of the subject shoes in the learning, without differentiation of users, to learn correlations between the design element indexes and the impression indexes, and creates an impression estimation model.

FIG. 10 illustrates correlations between m design element indexes D1 to Dm and n impression indexes I1 to In of shoes, with regard to serious runners. The design element indexes in this example include the shoe height (D1), the tiptoe elevation angle (D2), the overall average brightness (D3), and the overall average chroma (D4), for example. For the set of design element indexes D1 to Dm of the subject shoes shown in the first row, the impression index I1 is set to B, and I2 is set to B, for example. For the set of design element indexes D1 to Dm of the subject shoes shown in the second row, the impression index I1 is set to A, and I2 is set to A. For the set of design element indexes D1 to Dm of the subject shoes shown in the third row, the impression index I1 is set to A, and I2 is set to C. For the set of design element indexes D1 to Dm of the subject shoes shown in the fourth row, the impression index I1 is set to B, and I2 is set to C.

FIG. 11 illustrates correlations between the m design element indexes D1 to Dm and the n impression indexes I1 to In of the shoes, with regard to fun runners. The values of the design element indexes D1 to Dm of the subject shoes shown in each row are identical with those in FIG. 10. However, the impression indexes I1 to In of each of the subject shoes are different from those for the serious runners. For the subject shoes in the first row, the impression index I1 is set to B, and I2 is set to C. For the subject shoes in the second row, the impression index I1 is set to A, and I2 is set to B. For the subject shoes in the third row, the impression index I1 is set to B, and I2 is set to B. For the subject shoes in the fourth row, the impression index I1 is set to C, and I2 is set to C.

Using pairs of design element indexes D1 to Dm and impression indexes I1 to In of the subject shoes in the learning for each target segment provided as teacher data, as shown in FIGS. 10 and 11, a model for estimating the impression indexes I1 to In based on the design element indexes D1 to Dm of shoes is created by means of a decision tree analysis, such as a random forest. For each impression index, an estimation model using a decision tree is created, in which design element indexes are set as explanatory variables, and the impression index is set as the objective variable.

For machine learning, another method other than the decision tree analyses may be used. For example, a regression model, a neural network, or Bayesian estimation may be used.

Referring back to FIG. 1, the learning unit 40 stores the impression estimation model created for each target segment in an impression estimation model storage unit 50.

An impression index estimation unit 60 receives a target segment from the target segment input unit 20 and retrieves an impression estimation model for the target segment from the impression estimation model storage unit 50. By means of the impression estimation model for the target segment, the impression index estimation unit 60 estimates impression indexes of the shoes to be evaluated for the users belonging to the target segment, based on the set of design element indexes of the shoes to be evaluated provided by the design element index input unit 10. For example, when the target segment is the "serious runners", excellent sense of speed and inferior sturdiness may be estimated as the evaluation values of impression indexes using a learned estimation model, based on a set of multiple design element indexes of the shoes to be evaluated.

The impression index estimation unit 60 may be configured to receive a target impression index that needs to be improved, and output the evaluation value of the target impression index.

The impression index estimation unit 60 may also be configured to extract at least one design element index, in descending order of the degree of influence on the impression index to be evaluated. Since the degrees of influence of explanatory variables are estimated in a random forest, by referring to the degrees of influence of explanatory variables in decision trees, the design element indexes can be extracted in descending order of the degree of influence on the impression index to be evaluated.

An output unit 70 outputs the evaluation values of impression indexes estimated by the impression index estimation unit 60. The evaluation values of impression indexes may be the three levels of A, B, and C that respectively mean "excellent", "average", and "inferior", for example.

The output unit 70 may also be configured to output the design element indexes extracted in descending order of the degree of influence on each impression index, together with the evaluation value of the impression index. In this case, for each of the design element indexes extracted in descending order of the degree of influence on each impression index, the output unit 70 may also output a direction and a range of modification of the design element index for improving the impression index.

Figure 12:
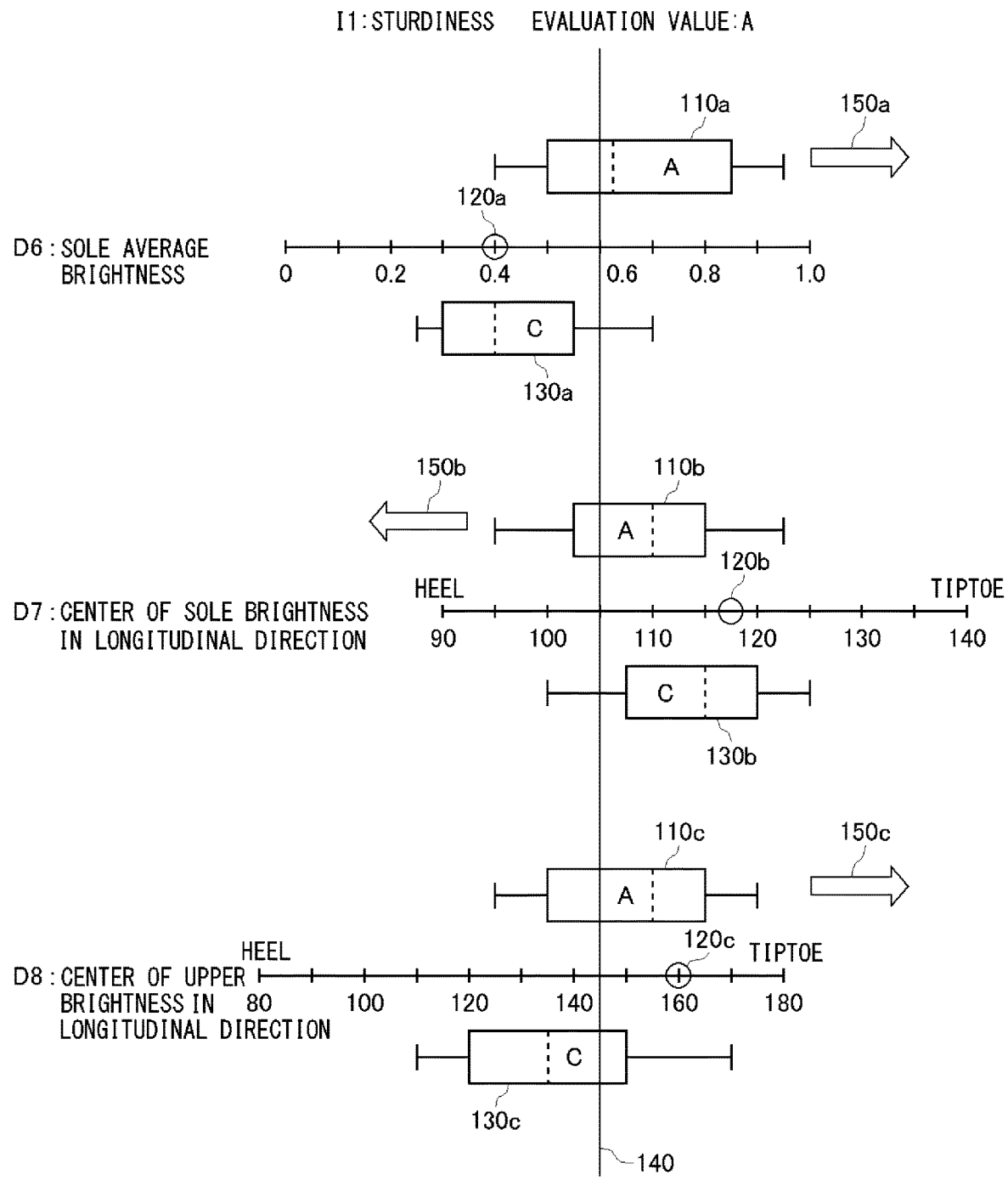
FIG. 12 shows an evaluation value of an impression index estimated for shoes to be evaluated and illustrates a direction and a range of modification of each design element index that affects the impression index.

FIG. 12 shows the evaluation value of the impression index I1 estimated for shoes to be evaluated and illustrates a direction and a range of modification of each design element index that affects the impression index I1. The impression index I1 is sturdiness, and the evaluation value thereof is A. As the top three design element indexes in descending order of the degree of influence on the impression index I1, the sole average brightness (D6), the center of sole brightness in the longitudinal direction (D7), and the center of upper brightness in the longitudinal direction (D8) are provided.

In FIG. 12, an average value of each design element index of all shoes is positioned on a vertical axis 140, and values of each design element index are provided along a horizontal axis. An input value 120a of the design element index D6 of the shoes to be evaluated is 0.4. A symbol 110a indicates a range of the design element index D6 of shoes of which the evaluation value of the impression index I1 is A (the range will be referred to as the "A zone"), and an intermediate value in the range is indicated by a dotted line. Also, a symbol 130a indicates a range of the design element index D6 of shoes of which the evaluation value of the impression index I1 is C (the range will be referred to as the "C zone"), and an intermediate value in the range is indicated by a dotted line.

It is found that the input value 120a of the design element index D6 of the shoes to be evaluated is lower than the average value of all shoes and is positioned out of the A zone 110a but within the C zone 130a. An arrow with a symbol 150a indicates the direction of modification of the design element index D6 of the shoes to be evaluated for improving the impression index I1. This example illustrates that the direction of increasing the sole average brightness, as the design element index D6, of the shoes, i.e., changing the brightness such that the sole as a whole becomes brighter, corresponds to the direction of design modification for improving the impression index I1. With regard to the range of modification, the design element index is modified such as to exceed the average value of all shoes and also exceed the intermediate value of the A zone, in the direction of modification.

Similarly, an input value 120b of the design element index D7 is higher than the average value of all shoes and is positioned out of an A zone 110b but within a C zone 130b. An arrow with a symbol 150b indicates the direction of modification of the design element index D7 for improving the impression index I1. This example illustrates that the direction of shifting the center of sole brightness in the longitudinal direction, as the design element index D7, toward the heel side, i.e., changing the brightness such that the heel side of the sole becomes brighter, corresponds to the direction of design modification.

For an input value 120c of the design element index D8, an arrow with a symbol 150c indicates the direction of modification. This example illustrates that the direction of shifting the center of upper brightness in the longitudinal direction, as the design element index D9, toward the tiptoe side, i.e., changing the brightness such that the tiptoe side of the upper becomes brighter, corresponds to the direction of design modification.

Figure 13:
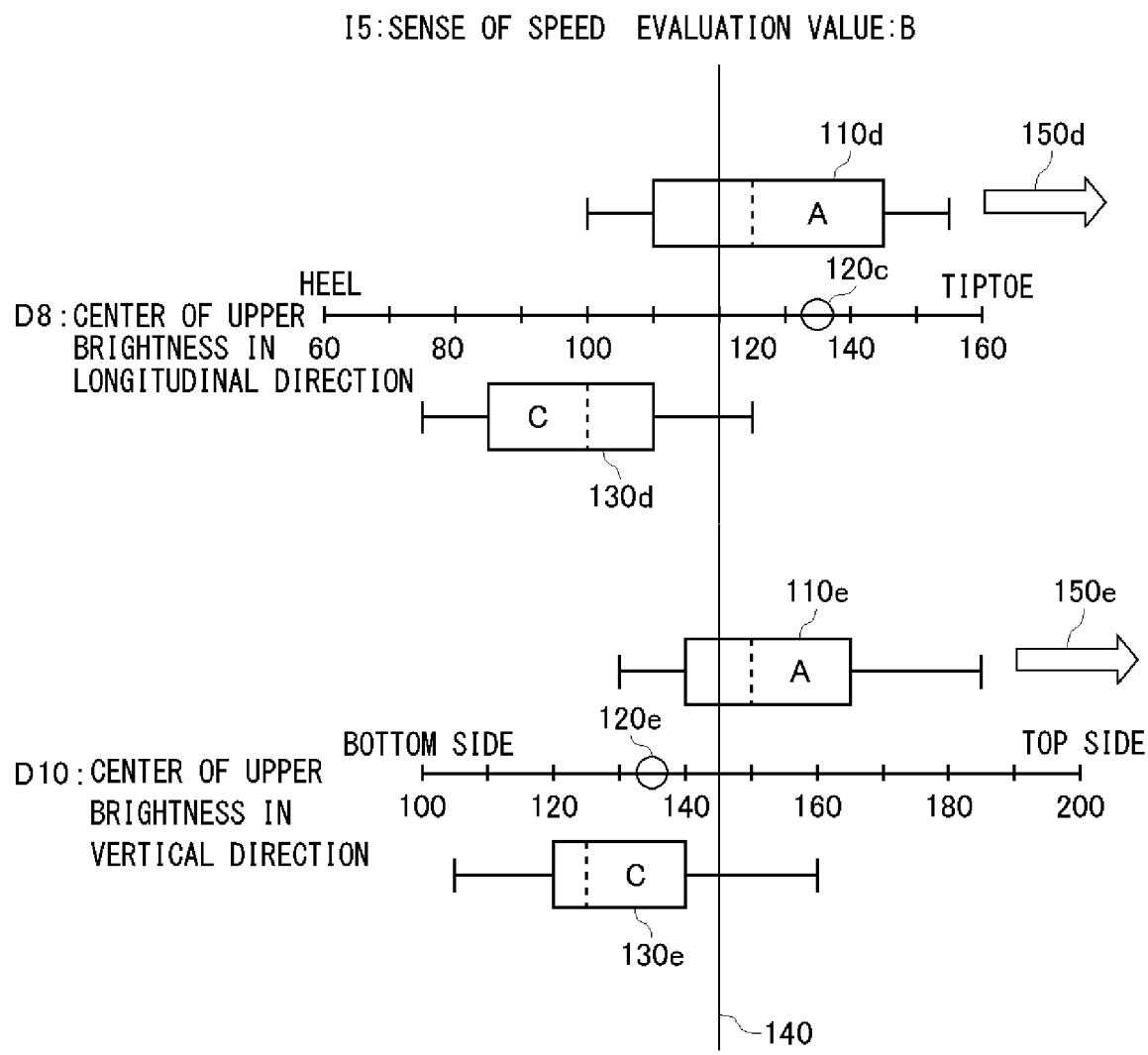
FIG. 13 shows an evaluation value of another impression index estimated for the shoes to be evaluated and illustrates a direction and a range of modification of each design element index that affects the impression index.

FIG. 13 shows the evaluation value of the impression index I5 estimated for shoes to be evaluated and illustrates a direction and a range of modification of each design element index that affects the impression index I5. The impression index I5 is a sense of speed, and the evaluation value thereof is B. As the top two design element indexes in descending order of the degree of influence on the impression index I5, the center of upper brightness in the longitudinal direction (D8) and the center of upper chroma in the vertical direction (D10) are provided.

FIG. 13 illustrates an input value 120d, an A zone 110d, a C zone 130d, and a modification direction 150d of the design element index D8 of the shoes to be evaluated. This example illustrates that the direction of shifting the center of upper brightness in the longitudinal direction, as the design element index D8, toward the tiptoe side, i.e., changing the brightness such that the tiptoe side of the upper becomes brighter, corresponds to the direction of design modification.

Similarly, FIG. 13 also illustrates an input value 120e, an A zone 110e, a C zone 130e, and a modification direction 150e of the design element index D10 of the shoes to be evaluated. This example illustrates that the direction of shifting the center of upper chroma in the vertical direction, as the design element index D10, toward the top side, i.e., changing the chroma such that the top side of the upper becomes more vivid, corresponds to the direction of design modification.

Referring back to FIG. 1, a design element index modification unit 80 modifies a design element index based on the modification directivity provided by the output unit 70. The modification of the design element index may be automatically performed by the designing support device 100, or an operator of the designing support device 100 may enter a changed value of the design element index. The design element index modification unit 80 provides the modified design element index to the design element index input unit 10. Based on the modified design element index, the impression index estimation unit 60 estimates the corresponding impression index again using the estimation model, and the output unit 70 outputs the new evaluation value of the impression index. By repeating the modification processing, the impression index can be improved with the design element indexes changed, so that the design can be modified.

Figure 14:
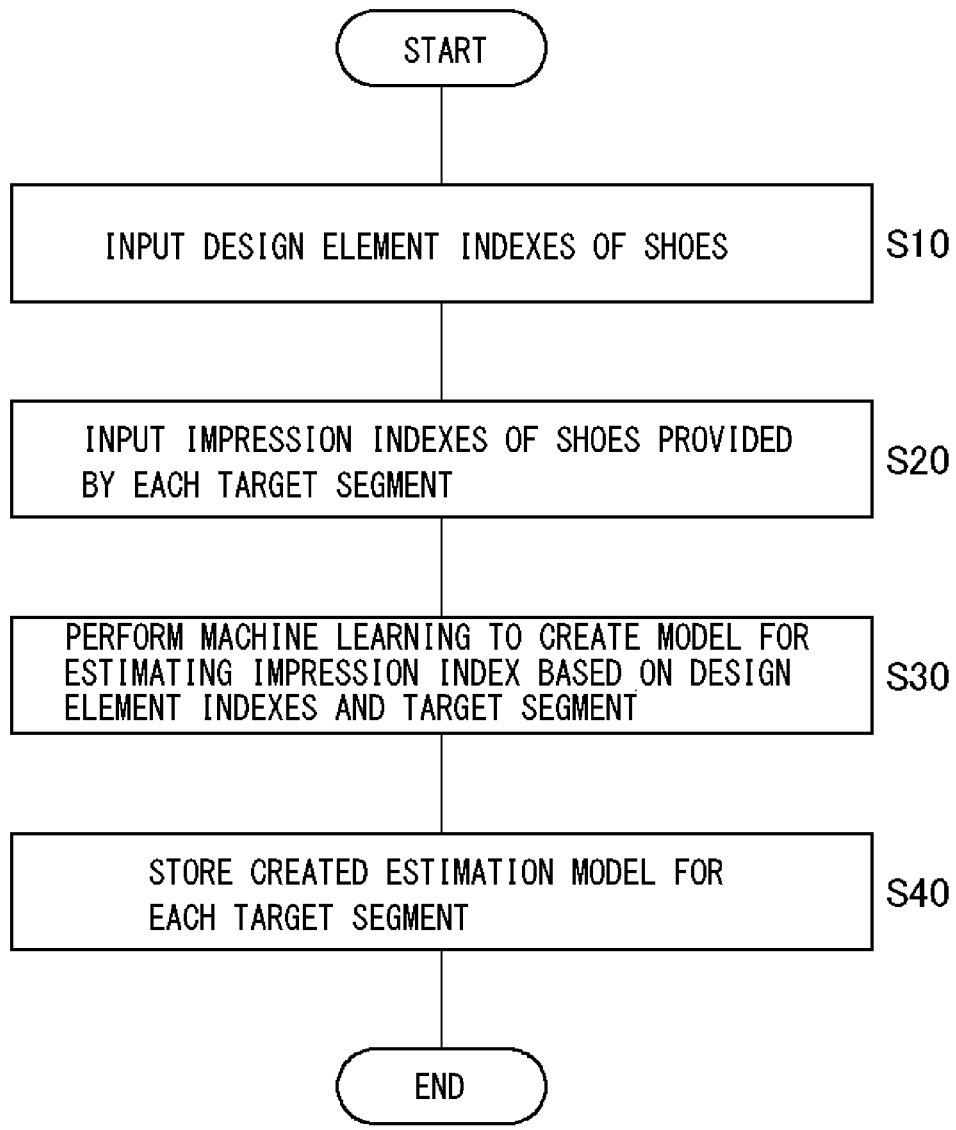
FIG. 14 is a flowchart that represents a procedure for creating, through machine learning, an estimation model used to estimate an impression index of shoes based on a set of multiple design element indexes of the shoes.

FIG. 14 is a flowchart that represents a procedure for creating, through machine learning, an estimation model used to estimate an impression index of shoes based on a set of multiple design element indexes of the shoes. This procedure corresponds to a machine learning phase in which the learning unit 40 creates an estimation model using evaluation data for shoes provided by a number of users.

The design element index input unit 10 inputs design element indexes of the subject shoes in the learning (S10). An image or a three-dimensional model of the subject shoes may be preprocessed to extract the design element indexes of the shoes.

The target segment input unit 20 inputs target segments for evaluating the subject shoes in the learning, and the impression index input unit 30 inputs the evaluation values of impression indexes of the subject shoes provided by each target segment (S20).

The learning unit 40 performs machine learning to obtain correlations between the design element indexes of the subject shoes in the learning and the impression indexes provided by each target segment, and creates an estimation model used to estimate an impression index based on design element indexes and a target segment (S30).

The learning unit 40 stores an estimation model thus created for each target segment in the impression estimation model storage unit 50 (S40).

Figure 15:
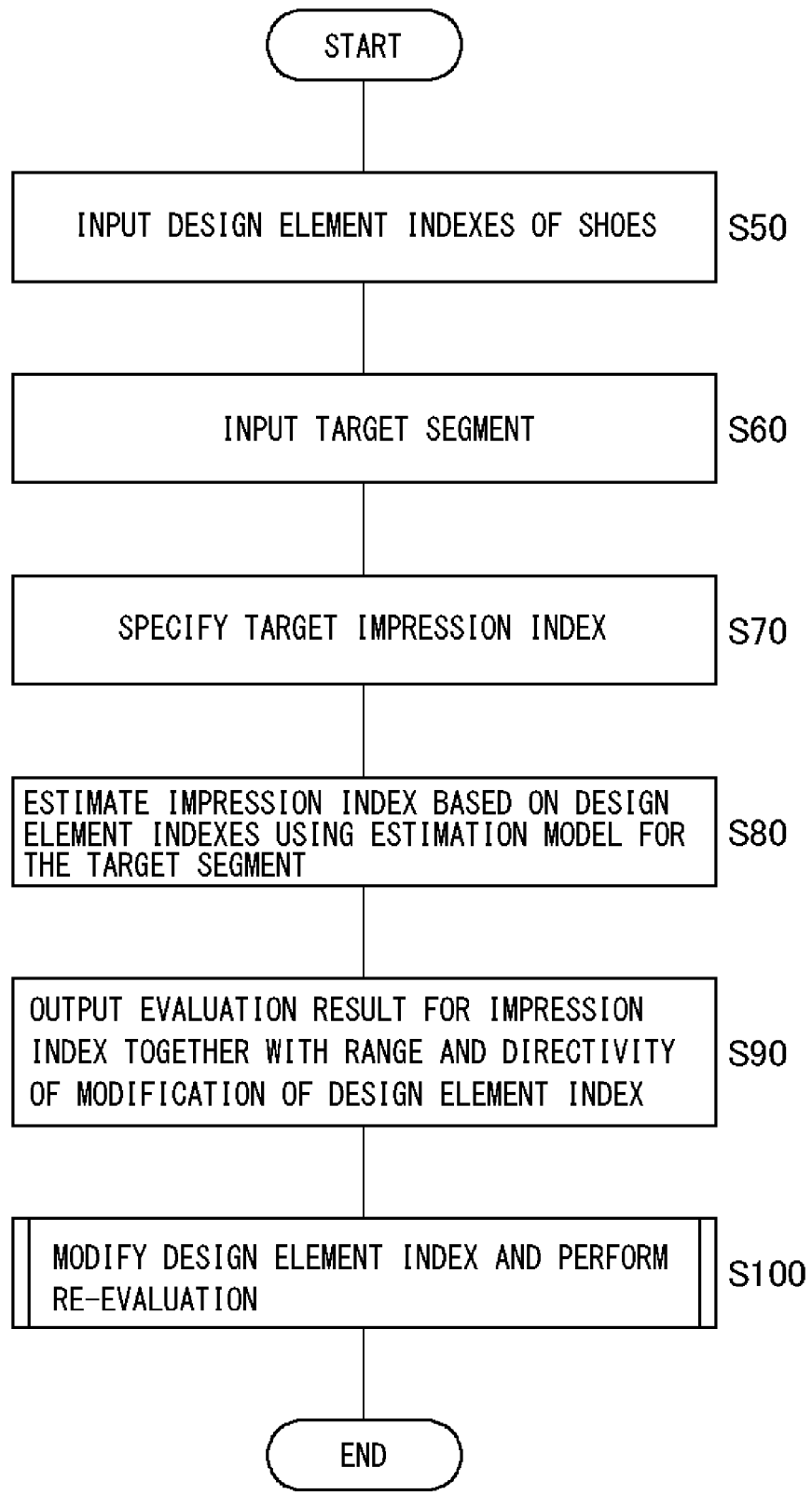
FIG. 15 is a flowchart that represents a procedure for estimating an impression index based on design element indexes and a target segment by using a learned estimation model.

FIG. 15 is a flowchart that represents a procedure for estimating an impression index based on design element indexes and a target segment by using a learned estimation model. This procedure corresponds to a phase in which the impression index estimation unit 60 estimates an impression index based on design element indexes and a target segment by using an estimation model created by the learning unit 40.

The design element index input unit 10 inputs design element indexes of the shoes to be evaluated (S50). The target segment input unit 20 inputs a specific target segment (S60). The impression index input unit 30 specifies an impression index to be improved (S70).

By means of the estimation model for the specific target segment retrieved from the impression estimation model storage unit 50, the impression index estimation unit 60 estimates the impression index of the shoes to be evaluated, based on the design element indexes of the shoes that have been input (S80).

The output unit 70 outputs the evaluation value of the impression index to be improved, together with a range and directivity of modification of each design element index that affects the impression index (S90).

The design element index modification unit 80 modifies a design element index that affects the impression index based on the modification direction, and the impression index estimation unit 60 re-evaluates the impression index based on the design element index thus modified, using the estimation model (S100).

Figure 16:
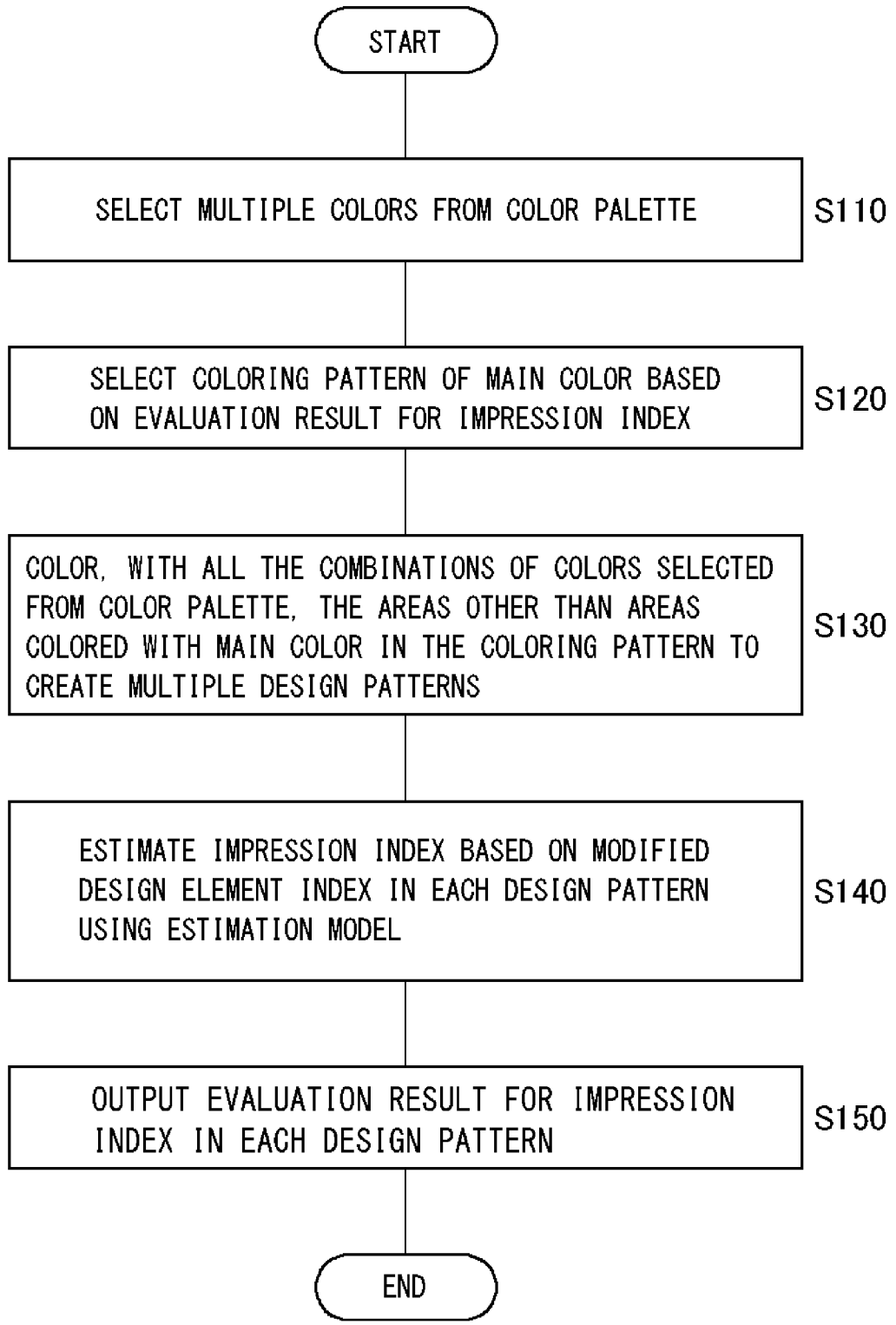
FIG. 16 is a flowchart that represents a procedure of the design modification and re-evaluation process shown in FIG. 15.
Figure 17A:
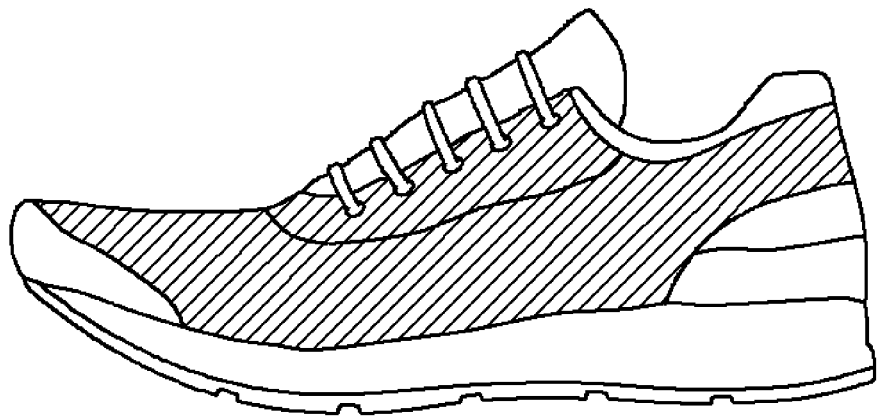
FIGS. 17A-17F illustrate coloring patterns of the main color of shoes to be evaluated.
Figure 17B:
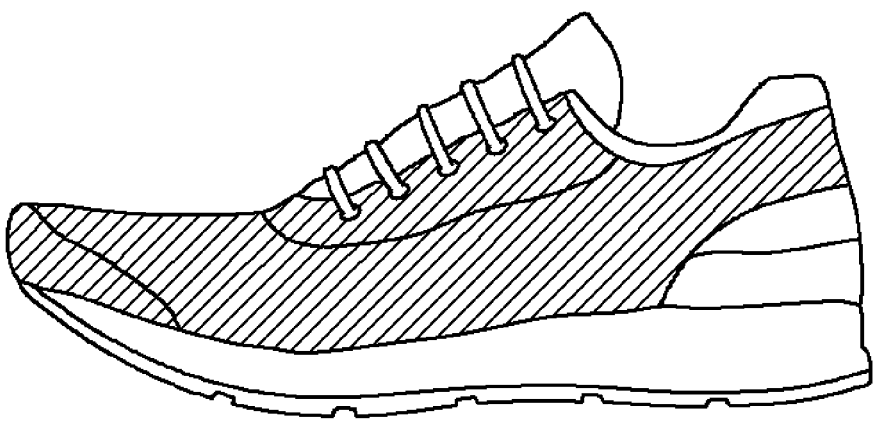
Figure 17C:
Figure 17D:
Figure 17E:
Figure 17F:

FIG. 16 is a flowchart that represents an example of the design modification and re-evaluation process at S100 shown in FIG. 15. As an example, a procedure for changing a color based on the evaluation result for an impression index will be described.

Multiple colors are selected in advance from a color palette (S110).

Based on the evaluation result for an impression index, a coloring pattern of the main color is selected (S120). FIGS. 17A-17F illustrate coloring patterns of the main color of the shoes to be evaluated. The diagonally shaded areas are colored with the main color. The areas that can be colored with the main color are specified in advance. The areas that can be colored with the main color may be extracted by identifying, in the coloring patterns of shoes sold in the past, the areas colored with the color concerned. By changing whether or not to use the main color in the coloring of each area that can be colored with the main color, different coloring patterns as illustrated in FIGS. 17A-17F, for example, can be obtained.

Based on the degree of contribution of each design element index output together with the evaluation result for the impression index, a coloring pattern may be selected from among the coloring patterns of FIGS. 17A-17F. For example, when a design element index that contributes to the impression index is the center of upper brightness in the longitudinal direction and when the modification direction of the design element index is the direction of making the tiptoe side brighter, a pattern in which the tiptoe area of the upper is colored with the main color may be selected from among the coloring patterns of FIGS. 17A-17F. When multiple design element indexes contribute to the improvement of the impression index, a design element index with a higher degree of contribution is preferentially selected. When which design element index contributes to the improvement of the impression index is not clear, a coloring pattern may be randomly selected.

In the selected coloring pattern, the areas other than the areas colored with the main color are colored with all the combinations of colors selected from the color palette, so that multiple design patterns are created (S130).

Based on the modified design element index in each design pattern, the impression index estimation unit 60 estimates the impression index using the estimation model (S140). The output unit 70 outputs the evaluation result for the impression index in each design pattern (S150). Thus, the impressions of the modified design patterns can be re-evaluated.

In the description above, shoes are selected as an example of products. The designing support device 100 of the present embodiment may also be applied to other products besides shoes, such as clothes. In this case, clothes may be divided into collars, sleeves, and other parts, and impression indexes for the entire clothes may be estimated based on the design element indexes of the parts of the clothes.

As described above, the designing support device 100 of the present embodiment uses, as teacher data, evaluation data regarding consumers' impressions of shoes, so as to learn a model used to estimate an impression index of shoes for each target segment based on the design indexes of parts of the shoes. Further, by means of a learned estimation model, the designing support device 100 can estimate an impression index of shoes for a specific target segment based on the design indexes of parts of the shoes, and can also provide the directivity of modification of a design element index for improving the impression index. The directivity of modification of a design element index is determined based on the impression evaluation data of consumers. Accordingly, the design element index can be modified without dependence on the skill or senses of the designer.

Second Embodiment

The second embodiment describes a product recommendation device using the impression estimation models described in the first embodiment. The product recommendation device of the second embodiment recommends, to a user, a product of which the impressions are similar to those of products in which the user has expressed interest on online shopping sites and the like, or products that the user has purchased in the past. Besides shoes as described in the first embodiment, the product may also be clothes, stationery, or any other product of which the impressions change depending on the design of the constituting elements of the product.

Figure 18:
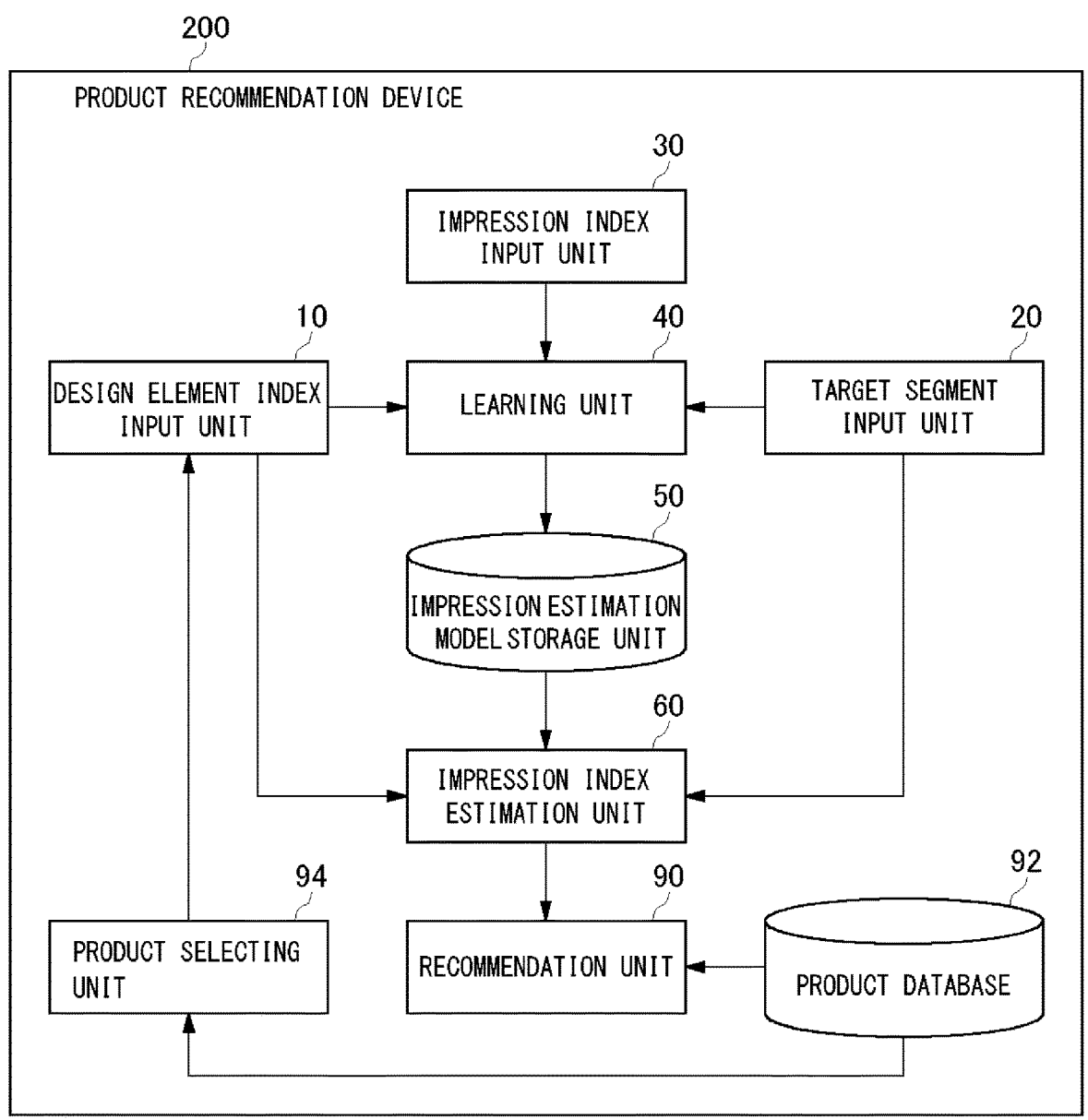
FIG. 18 is a configuration diagram of a product recommendation device of a second embodiment.

FIG. 18 is a configuration diagram of a product recommendation device 200 of the second embodiment. The description regarding the configurations and operations same as those in the designing support device 100 of the first embodiment will be appropriately omitted.

The design element index input unit 10 inputs design element indexes obtained by quantifying design in association with an entire product or portions constituting the product. The target segment input unit 20 inputs a target user segment. The impression index input unit 30 inputs impression indexes obtained by quantifying users' impressions of the product and sorting the impressions by target segment.

The learning unit 40 uses as teacher data: the design element indexes of the product provided by the design element index input unit 10; the target segment provided by the target segment input unit 20; and the impression indexes of the product for users belonging to the target segment, provided by the impression index input unit 30. The learning unit 40 uses the teacher data to learn correlations between the design element indexes and the impression indexes and creates an impression estimation model for each target segment, and stores the impression estimation model in the impression estimation model storage unit 50. Classifying the users of the product into segments is an option. Without differentiation of users, the learning unit 40 may use, as teacher data, pairs of design element indexes and impression indexes of the product to learn correlations between the design element indexes and the impression indexes, and create an impression estimation model.

A product selecting unit 94 extracts, from a product database 92, design element indexes of a product specified by a user on an online shopping site or the like and provides the design element indexes to the design element index input unit 10. The design element index input unit 10 provides the design element indexes of the product specified by the user to the impression index estimation unit 60. The target segment input unit 20 provides the segment of the user who has specified the product, to the impression index estimation unit 60. When the users of the product are not classified into segments, the input of the target segment is unnecessary.

The impression index estimation unit 60 receives the target segment from the target segment input unit 20 and retrieves an impression estimation model for the target segment from the impression estimation model storage unit 50. By means of the impression estimation model for the target segment, the impression index estimation unit 60 estimates impression indexes of the product for the users belonging to the target segment, based on the set of design element indexes of the product provided by the design element index input unit 10. When the users of the product are not classified into segments, impression indexes of the product for the users are estimated based on an impression estimation model independent of the target segment.

A recommendation unit 90 selects, from the product database 92, another product having impression indexes similar to the impression indexes estimated by the impression index estimation unit 60, and recommends the another product to the user. A similarity range of each impression index may be determined with predetermined thresholds. With the recommendation unit 90, the user can view another product with different design that however has impression indexes similar to the impression indexes of the product specified by the user.

In the description above, the design element indexes of a product specified by a user on an online shopping site or the like are provided to the design element index input unit 10. Alternatively, a product purchase history or a product viewing history of a user may be referred to, and the design element indexes of a product purchased or viewed by the user in the past may be provided to the design element index input unit 10. In this case, the impression index estimation unit 60 estimates the impression indexes based on a set of the design element indexes of the product purchased or viewed in the past. Also, the recommendation unit 90 recommends, to the user, another product having impression indexes similar to the impression indexes of the product purchased or viewed in the past.

The present invention has been described with reference to embodiments. The embodiments are intended to be illustrative only, and it will be obvious to those skilled in the art that various modifications to a combination of constituting elements or processes could be developed and that such modifications also fall within the scope of the present invention.

INDUSTRIAL APPLICABILITY

The present invention is applicable to a technology for supporting product designing and also to a technology for product recommendation.

REFERENCE SIGNS LIST

10 design element index input unit
20 target segment input unit
30 impression index input unit
40 learning unit
50 impression estimation model storage unit
60 impression index estimation unit
70 output unit
80 design element index modification unit
90 recommendation unit
92 product database
94 product selecting unit
100 designing support device
200 product recommendation device

The invention claimed is:

1. A designing support device, comprising:
an input unit that inputs a plurality of design element indexes obtained by quantifying design in association with a plurality of portions constituting shoes;
a target segment input unit that inputs a plurality of target segments for evaluating a subject shoe;
a learning unit that receives the plurality of design element indexes input through the input unit and the plurality of target segments input through the target segment input unit, performs machine learning to obtain correlations between the plurality of the design element indexes and impression indexes of the shoes using the plurality of design element indexes and the plurality of target segments, and creates an impression estimation model based on the correlations obtained by the machine learning;
an estimation unit that estimates an impression index obtained by quantifying an impression of the shoes by using the created impression estimation model, based on a set of a plurality of the design element indexes that have been input; and
an output unit that outputs the impression index thus estimated,
wherein the design element indexes include at least one of a radius of curvature of an instep of the shoes, a tiptoe elevation angle of the shoes, or a height of the shoes.

2. The designing support device of claim 1, wherein
the learning unit uses, as teacher data, pairs of a plurality of the design element indexes and the impression index for each of a plurality of segments into which users of the shoes are classified to learn the correlations between a plurality of the design element indexes and the impression index, and creates the impression estimation model for each of the segments,
the input unit further inputs a segment, and,
by means of the impression estimation model learned for each of the segments, the estimation unit estimates the impression index based on the segment and a plurality of the design element indexes that have been input.

3. The designing support device of claim 1, wherein
the estimation unit extracts at least one design element index in descending order of a degree of influence on the impression index, and
the output unit outputs the design element index extracted for each impression index, together with the impression index.

4. The designing support device of claim 3, wherein, with regard to the design element index extracted for each impression index, the output unit also outputs a direction of modification of the design element index for improving the impression index.

5. The designing support device of claim 3, wherein, with regard to the design element index extracted for each impression index, the output unit also outputs a range of modification of the design element index for improving the impression index.

6. The designing support device of claim 3, further comprising a design element index modification unit that modifies the design element index extracted for each impression index, wherein
the estimation unit re-estimates the impression index using the design element index thus modified.

7. The designing support device of claim 1, wherein the design element indexes further include an index related to a color or texture in association with each of the plurality of portions constituting the shoes.

8. The designing support device of claim 1, further comprising a recommendation unit that recommends other shoes having an impression index similar to the impression index that has been estimated.

9. A designing support method, comprising:
inputting a plurality of design element indexes obtained by quantifying design in association with a plurality of portions constituting shoes;
inputting a plurality of target segments for evaluating a subject shoe;

receiving the plurality of design element indexes and the plurality of target segments, performing machine learning to obtain correlations between the plurality of the design element indexes and impression indexes of the shoes using the plurality of design element indexes and the plurality of target segments, and creating an impression estimation model based on the correlations obtained by the machine learning;

estimating an impression index obtained by quantifying an impression of the shoes by using the created impression estimation model, based on a set of a plurality of the design element indexes that have been input; and outputting the impression index thus estimated, wherein the design element indexes include at least one of a radius of curvature of an instep of the shoes, a tiptoe elevation angle of the shoes, or a height of the shoes.

* * * * *